United States Patent
Acharya et al.

(10) Patent No.: US 7,106,910 B2
(45) Date of Patent: Sep. 12, 2006

(54) COLOR VIDEO CODING SCHEME

(75) Inventors: Tinku Acharya, Chandler, AZ (US); Prabir K. Biswas, Kharagpur (IN)

(73) Assignee: Intel Corporation, Santa Clara, CA (US)

( * ) Notice: Subject to any disclaimer, the term of this patent is extended or adjusted under 35 U.S.C. 154(b) by 667 days.

(21) Appl. No.: 10/206,908

(22) Filed: Jul. 25, 2002

(65) Prior Publication Data

US 2004/0017952 A1    Jan. 29, 2004

Related U.S. Application Data

(63) Continuation-in-part of application No. 09/867,784, filed on May 29, 2001, now Pat. No. 6,956,903, and a continuation-in-part of application No. 09/867,781, filed on May 29, 2001, now Pat. No. 6,834,123, and a continuation-in-part of application No. 09/411,697, filed on Oct. 1, 1999, now Pat. No. 6,798,901.

(51) Int. Cl.
*G06K 9/46* (2006.01)

(52) U.S. Cl. .................. 382/240; 382/166; 382/238

(58) Field of Classification Search ............... 382/166, 382/240, 232–233, 236, 238, 239, 244–248, 382/250, 167, 276–277, 254–255, 298–300; 375/240.18, 240.19, 240.12, 240.23; 708/400–407; 341/63, 67; 348/273, 607; 358/1.9, 518–539
See application file for complete search history.

(56) References Cited

U.S. PATENT DOCUMENTS

| | | | |
|---|---|---|---|
| 5,875,122 A | 2/1999 | Acharya | |
| 5,956,467 A * | 9/1999 | Rabbani et al. | ............... 358/1.9 |
| 5,995,210 A | 11/1999 | Acharya | |
| 6,009,201 A | 12/1999 | Acharya | |
| 6,009,206 A | 12/1999 | Acharya | |
| 6,047,303 A | 4/2000 | Acharya | |
| 6,091,851 A | 7/2000 | Acharya | |
| 6,094,508 A | 7/2000 | Acharya et al. | |
| 6,108,453 A | 8/2000 | Acharya | |
| 6,124,811 A | 9/2000 | Acharya et al. | |
| 6,130,960 A | 10/2000 | Acharya | |
| 6,151,069 A | 11/2000 | Dunton et al. | |
| 6,151,415 A | 11/2000 | Acharya et al. | |
| 6,154,493 A | 11/2000 | Acharya et al. | |
| 6,166,664 A | 12/2000 | Acharya | |
| 6,178,269 B1 | 1/2001 | Acharya | |
| 6,195,026 B1 | 2/2001 | Acharya | |
| 6,215,908 B1 | 4/2001 | Pazmino et al. | |
| 6,215,916 B1 | 4/2001 | Acharya | |
| 6,229,578 B1 | 5/2001 | Acharya et al. | |

(Continued)

OTHER PUBLICATIONS

Kim et al., Low-Delay Embedded 3-D Wavelet Color Video Coding, SPIE vol. 3309 0277-786/97, pp. 955-964.*

(Continued)

*Primary Examiner*—Ishrat Sherali
(74) *Attorney, Agent, or Firm*—Joni D. Stutman-Horn

(57) ABSTRACT

Embodiments of a color video coding and decoding scheme are disclosed. In one embodiment, an efficient color coding scheme for color video using three dimensional (3-D) discrete wavelet transforms (DWT) employing correlation among different color components is described. At least one of the color components is coded, and an adjustment to at least some of the remaining color components relative to the coded color component are then coded. This adjustment comprises a partial error adjustment based at least in part on a ratio of color components intensities. Other embodiments, for instance for decoding, are described and claimed.

28 Claims, 12 Drawing Sheets

U.S. PATENT DOCUMENTS

| | | | |
|---|---|---|---|
| 6,233,358 B1 | 5/2001 | Acharya | |
| 6,236,433 B1 | 5/2001 | Acharya et al. | |
| 6,236,765 B1 | 5/2001 | Acharya | |
| 6,269,181 B1 | 7/2001 | Acharya | |
| 6,275,206 B1 | 8/2001 | Tsai et al. | |
| 6,285,796 B1 | 9/2001 | Acharya et al. | |
| 6,292,114 B1 | 9/2001 | Tsai et al. | |
| 6,611,620 B1* | 8/2003 | Kobayashi et al. | 382/166 |
| 6,798,901 B1* | 9/2004 | Acharya et al. | 382/166 |
| 6,834,123 B1* | 12/2004 | Acharya et al. | 382/240 |
| 6,850,570 B1* | 2/2005 | Pesquet-Popescu et al. | 375/240.19 |

OTHER PUBLICATIONS

Weeks et al., 3D Discrete Wavelet Transform Architecture, IEEE 0-7803-4455, iv-57 thru IV-60.*

"A Memory Based VLSI Architecture for Image Compression", Inventor: Acharya, U.S. Appl. No. 09/885,415, filed Jun. 30, 1997, 37 Pgs.

"A New Scaling Algorithm and Architecture for Integer Scaling in Video", Inventor: Acharya, et al., U.S. Appl. No. 09/008,131, filed Jan. 16, 1998, 38 Pgs.

"A Median Computation-Based Integrated Color Interpolationi and Color Space Conversion Methodology From 8-Bit Bayer Pattern RGB Color Space to 12-Bit YCrCb Color Space", Inventor: Acharya, U.S. Appl. No. 09/040,806, filed Mar. 18, 1998, 43 Pgs.

"An Integrated Color Interpolation and Color Space Conversion Algorithm From 8-Bit Bayer Pattern RGB Color Space to 24-Bit CIE XYZ Color Space", Inventor: Acharya, U.S. Appl. No. 09/048,901, filed Mar. 26, 1998, 36 Pgs.

"A Median Computation-Based Integrated Color Interpolation and Color Space Conversion Methodology From 8-Bit Bayer Pattern RGB Color Space to 24-Bit CIE XYZ Color Space", Inventor: Acharya, U.S. Appl. No. 09/050,743, filed Mar. 30,, 1998, 37 Pgs.

"Infrared Correction System", Inventors: Bawolek, et al., U.S. Appl. No. 09/126,203, filed Jul. 30, 1998, 23 Pgs.

"An Efficient Methodology to Select the Quantization Threshold Parameters in a DWT-Based Image Compression Scheme in Order to Store a Predefined Minimum Number of Images into a Fixed Size Secondary Storage", Inventor: Acharya, U.S. Appl. No. 09/146,159, filed Sep. 3, 1998, 35 Pgs.

"Method of Compressing and/or Decompressing a Data Set Using Significance Mapping", Inventors: Pazmino, et al., U.S. Appl. No. 09/151,336, filed Sep. 11, 1998, 25 Pgs.

"Reduction of Ringing Artifacts After Decompression of a DWT-Based Compressed Image", Inventors: Tan, et al., U.S. Appl. No. 09/165,511, filed Oct. 2, 1998, 20 Pgs.

"Robust Sequential Approach in Detecting Defective Pixels Within an Image Sensor" Inventors: Tan, et al., U.S. Appl. No. 09/191,310, filed Nov. 13, 1998, 35 Pgs.

"Color Interpolation for a Four Color Mosaic Pattern", Inventors: Acharya, et al., U.S. Appl. No. 09/199,836, filed Nov. 24, 1998, 26 Pgs.

"A Mathematical Model for Gray Scale and Contrast Enhancement of a Digital Image", Inventor: Acharya, U.S. Appl. No. 09/207,753, filed Dec. 8, 1998, 28 Pages.

"Hi-Speed Deterministic Approach in Detecting Defective Pixels Within an Image Sensor" Inventors: Tan, et al., U.S. Appl. No. 09/258,636, filed Feb. 26, 1999, 32 Pgs.

"Enhancing Image Compression Performance by Morphological Processing", Inventor: Acharya, U.S. Appl. No. 09/291,810, filed Apr. 14, 1999, 31 Pgs.

"An Edge Enhanced Image Up-Sampling Algorithm Using Discrete Wavelet Transform", Inventors: Acharya, et al., U.S. Appl. No. 09/292,763, filed Apr. 14, 1999, 32 Pgs.

"Using an Electronic Camera to Build a File Containing Text", Inventors: Tan, et al., U.S. Appl. No. 09/301,753, filed Apr. 29, 1999, 21 Pgs.

"Method and Apparatus for Adaptively Sharpening an Image", Inventors: Tsai, et al., U.S. Appl. No. 09/320,192, filed May 26, 1999, 27 Pgs.

"Method and Apparatus for Adaptively Sharpening Local Image Content of an Image", Inventors: Tan, et al., U.S. Appl. No. 09/328,935, filed Jun. 9, 1999, 29 Pgs.

"A Hardware Efficient Wavelet-Based Video Compression Scheme", Inventors: Tan, et al., U.S. Appl. No. 09/342,863, filed Jun. 29, 1999, 32 Pgs.

"Image Processing Method and Apparatus", Inventors: Acharya, et al., U.S. Appl. No. 09/359,523, filed Jul. 23, 1999, 16 Pgs.

"A Methodology for Color Correction With Noise Regulation", Inventors: Tan, et al., U.S. Appl. No. 09/359,831, filed Jul. 23, 1999, 30 Pgs.

"Method and Apparatus for Automatic Foocusing an Image Capture System Using Symmetric Fir Filters", Inventors: Tan, et al., U.S. Appl. No. 09/383,117, filed Aug. 25, 1999, 28 Pgs.

"Zerotree Encoding of Wavelet Data", Inventors: Acharya, et al., U.S. Appl. No. 09/390,255, filed Sep. 3, 1999, 22 Pgs.

"A Fuzzy Distinction Based Thresholding Technique for Image Segmentation" Inventors: Acharya, et al., U.S. Appl. No. 09/393,017, filed Sep. 10, 1999, 29 Pgs.

"A Fuzzy Based Thresholding Technique for Image Segmentation", Inventors: Acharya, et al., U.S. Appl. No. 09/393,136, filed Sep. 10, 1999, 28 Pgs.

"Video Motion Estimation", Inventor: Acharya, U.S. Appl. No. 09/406,032, filed Sep. 27, 1999, 24 Pgs.

"Method of Interpolating Color Pixel Signals From a Subsampled Color Image", Inventors: Acharya, et al., U.S. Appl. No. 09/410,800, filed Oct. 1, 1999, 20 Pgs.

"Method of Compressing a Color Image", Inventors: Acharya, et al., U.S. Appl. No. 09/411,697, filed Oct. 1, 1999, 26 Pgs.

"Square Root Raised Cosine Symmetric Filter for Mobile Telecommunications", Inventors: Acharya, et al. U.S. Appl. 09/429,058, filed Oct. 29, 1999, 36 Pgs.

"Discrete Filter", Inventor: Acharya, U.S. Appl. No. 09/432,337, filed Nov. 2, 1999, 16 Pgs.

"Indexing Wavelet Compressed Video", Inventors: Acharya, et al., U.S. Appl. No. 09/438,091, filed Nov. 10, 1999, 29 Pgs.

"Method of Converting a Sub-Sampled Color Image", Inventor: Acharya, U.S. Appl. No. 09/461,068, filed Dec. 14, 1999, 22 Pgs.

"Method of Upscaling a Color Image", Inventor: Acharya, U.S. Appl. No. 09/461,080, filed Dec. 14, 1999, 22 Pgs.

"Chip Rate Selectable Square Root Raised Consine Filter for Mobile Telecommunication", Inventors: Acharya, et al., U.S. Appl. No. 09/467,487, filed Dec. 20, 1999, 44 Pgs.

"Dual Mode Filter for Mobile Telecommunications", Inventors: Miao, et al., U.S. Appl. No. 09/467,611, filed Dec. 20, 1999, 49 Pgs.

"Image Processing Architecture", Inventors: Metz, et al., U.S. Appl. No. 09/473,643, filed Dec. 28, 1999, 16 Pgs.

"An Efficient Companding Algorithm Suitable for Color Imaging", Inventors: Acharya, et al., U.S. Appl. 09/482,551, filed Jan. 13, 2000, 44 Pgs.

"A Block-Matching Algorithm for Color Interpolation", Inventor: Acharya, U.S. Appl. No. 09/494,087, filed Jan. 28, 2000, 45 Pgs.

"Method of Inverse Quantizing Quantized Signal Samples of an Image During Image Decompression", Inventors: Acharya, et al., U.S. Appl. No. 09/507,213, filed Feb. 18, 2000, 32 Pgs.

"Method of Quantizing Signal Samples of an Image During Image Compression", Inventors: Acharya, et al., U.S. Appl. No. 09.507,399, filed Feb. 18, 2000, 24 Pgs.

"Method of Integrating a Watermark Into a Compressed Image", Inventors: Acharya, et al., U.S. Appl. No. 09/09519,135, filed Mar. 6, 2000, 25 Pgs.

"Method of Integrating a Watermark Into an Image", Inventors: Acharya, et al., U.S. Appl. No. 09/519,874, filed Mar. 6, 2000, 27 Pgs.

"Method of Using Hue to Interpolate Color Pixel Signals", Inventors: Acharya, et al., U.S. Appl. No. 09/591,867, filed Jun. 12, 2000, 23 Pgs.

"Dual Mode Digital Camera for Video and Still Operation", Inventors: Dunton, et al., U.S. Appl. No. 09/595,055, filed Jun. 16, 2000, 30 Pgs.

"Method of Perrforming Motion Estimation", Inventors: Kim, et al., U.S. Appl. No. 09/596,127, filed Jun. 16, 2000, 29 Pgs.

"Method of Compressing an Image", Inventors: Acharya, et al., U.S. Appl. No. 09/597,354, filed Jun. 19, 2000, 23 Pgs.

"Method of Video Coding Shoulder Movement from a Sequence of Images", Inventors: Acharya, et al., U.S. Appl. No. 09/607,724, filed Jun. 30, 2000, 24 Pgs.

"Method of Video Coding the Movement of a Human Face From a Sequence of Images", Inventors: Acharya, et al., U.S. Appl. No. 09/608,989, filed Jun. 30, 2000, 25 Pgs.

"Model-Based Video Image Coding", Inventors: Acharya, et al., U.S. Appl. No. 09/608,991, filed Jun. 30, 2000, 36 Pgs.

"Techniques to Implement One-Dimensional Compression", Inventor: Acharya, U.S. Appl. No. 09/666,486, filed Sep. 18, 2000, 18 Pgs.

"Techniques to Implement Two-Dimensional Compression", Inventor: Acharya, U.S. Appl. No. 09/664,131, filed Sep. 18, 2000, 24 Pgs.

"Sad Computation Architecture", Inventor: Acharya, U.S. Appl. No. 09/677,829, filed Sep. 29, 2000, 24 Pgs.

"Sad Computation Architecture", Inventor: Acharya, U.S. Appl. No. 09/677,830, filed Sep. 29, 2000, 27 Pgs.

"A Method of Performing Huffman Decoding", Inventors: Acharya, et al., U.S. Appl. No. 09/704,380, filed Oct. 31, 2000, 26 Pgs.

"A Method of Generating Huffman Code Length Information", Inventors: Acharya, et al., U.S. Appl. No. 09/704,392, filed Oct. 31, 2000, 25 Pgs.

"Method and Apparatus for Multiply-Accumulate Two-Dimensional Separable Symmetric Filtering", U.S. Appl. No. 09/718,877, filed Nov. 20, 2000, 13 Pgs.

"Method and Apparatus for Two-Dimensional Separable Symetric Filtering", U.S. Appl. No. 09/713,663, filed Nov. 15, 2000, 20 Pgs.

"Encoding of Wavelet Transformed Error Data", Inventor: Acharya, et al., U.S. Appl. No. 09/723,123, filed Nov. 27, 2000, 38 Pgs.

"Developing an Euler Vector for Images", Inventors: Acharya, et al., U.S. Appl. No. 09/722, 979, filed Nov. 27, 2000, 45 Pgs.

"Computing the Euler Number of a Binary Image", Inventors: Acharya, et al., U.S. Appl. No. 09/722,982, filed Nov. 27, 2000, 31 Pgs.

"Wavelet Coding of Video", Inventors: Acharya, et al., U.S. Appl. No. 09/722,988, filed Nov. 27, 2000, 40 Pgs.

"Imaging Device Connected to Processor-Based System Using High-Bandwidth Bus", Inventors: Acharya, et al., U.S. Appl. No. 09/726,773, filed Nov. 29, 2000, 31 Pgs.

"Color Filter Array and Color Imterpolation Algorithm", Inventors: Acharya, et al., U.S. Appl. No. 09/727,038, filed Nov. 30, 2000, 36 Pgs.

"Method of Geerating a Length-Constrained Huffman Code", Inventors: Acharya, et al., U.S. Appl. No. 09/705,314, filed Jan. 3, 2001, 17 Pgs.

"Method of Performing Video Encoding Rate Control", Inventors: Kim, et al., U.S. Appl. No. 09/754,227, filed Jan. 3, 2001, 28 Pgs.

"Method of Performing Video Encoding Rate Control Using Bit Budget", Inventors: Kim, et al., U.S. Appl. No. 09/754,682, filed Jan. 3, 2001, 25 Pgs.

"Method of Performing Video Encoding Rate Control Using Motion Estimation", Inventors: Kim, et al., U.S. Appl. No. 09/754,683, filed Jan. 3, 2001, 37 Pgs.

"Multiplierless Pyramid Filter", Inventor: Acharya, U.S. Appl. No. 09/754,684, filed Jan. 3, 2001, 22 Pgs.

"Image Retrieval Using Distance Measure", Inventors: Acharya, et al., U.S. Appl. No. 09/817,000, filed Mar. 23, 2001, 28 Pgs.

"Two-Dimensional Pyramid Filter Architecture", Inventor: Acharya, U.S. Appl. No. 09/817,711, filed Mar. 26, 2001, 33 Pgs.

"Pyramid Filter", Inventor: Acharya, U.S. Appl. No. 09/820,108, filed Mar. 28, 2001, 23 Pgs.

"Two-Dimensional Pyramid Filter Architecture", Inventor: Acharya, U.S. Appl. No. 09/823,212, filed Mar. 30, 2001, 37 Pgs.

"Two Dimensional Pyramid Filter Architecture", Inventor: Acharya, U.S. Appl. No. 09/823,390, filed Mar. 30, 2001, 38 Pgs.

Two-Dimensional Pyramid Filter Architecture:, Inventor: Acharya, U.S. Appl. No. 09/846,609, filed Apr. 30, 2001, 37 Pgs.

"Reduction of Ringing Artifacts After Decompression of DWT-Based Compressed Image", Inventors: Tan, et al., U.S. Appl. No. 09/863, 478, filed May 22, 2001, 24 Pgs.

"Method and Apparatus for Coding of Wavelet Transformed Coefficients", Inventors: Acharya, et al., U.S. Appl. No. 09/867, 781, filed May 29, 2001, 44 Pgs.

"Method and Apparatus for Three-Dimensional Wavelet Transform", Inventors: Acharya, U.S. Appl. No. 09/867,784, filed May 29, 2001, 30 Pgs.

"Method and Apparatus for Image Scaling", Inventor: Acharya, U.S. Appl. No. 09/917,476, filed Jul. 27, 2001, 19 Pgs.

"Varialbe Length Coding Packing Architecture", Inventors: Becker, et al., U.S. Appl. No. 09/935,524, filed Aug. 22, 2001, 33 Pgs.

"Fast Half-Pixel Motion Estimation Using Steepest Decent", U.S. Appl. No. 09/947,266, filed Sep. 5, 2001, 19 Pgs.

" Signal to Noise Ration Optimization for Video Compression Bit-Rate Control", U.S. Appl. No. 09/947,331, filed Sep. 5, 2001, 25 Pgs.

"Method and Apparatus to Reduce False Minutiae in a Binary Fingerprint Image", Inventors: Acharya, et al., U.S. Appl. No. 09/952,249, filed Sep. 13, 2001, 30 Pgs.

"Architecture for Processing Fingerprint Images", Inventors: Acharya, et al., U.S. Appl. No. 09/952,276, filed Sep. 13, 2001, 19 Pgs.

"Method and Apparatus for Providing a Binary Fingerprint Image", Inventors Acharya, et al., U.S. Appl. No. 09/952,284, filed Sep. 13, 2001, 26 Pgs.

"A Method for Block-Based Digital Image Watermarking", Inventors: Acharya, et al., filed Nov. 29, 2000, 11 Pgs.

"An Integrated Color Interpolation and Color Space Conversion Algorithm From 8-Bit Bayer Pattern RGB Color Space to 12-Bit YCRCB Color Space", Inventor: Acharya, U.S. Appl. No. 10/022,154, filed Dec. 14, 2001, 32 Pgs.

"Progressive Two-Dimensional (2D) Pyramid Filter", Inventors: Wang, et al., U.S. Appl. No. 10/039,434, filed Dec. 28, 2001, 26 Pgs.

"Method and Apparatus for Video Bit-Rate Control", Inventors: Kim, et al., U.S. Appl. No. 10/039,462, filed Dec. 28, 2001, 23 Pgs.

* cited by examiner $\boxed{2\downarrow1\downarrow1}$ : keep one frame out of two $\boxed{1\downarrow2\downarrow1}$ : keep one column out of two $\boxed{1\downarrow1\downarrow2}$ : keep one row out of two where, $h\tilde{}(n) = h(-n)$ $g(n) = (-1)^{1-n} \cdot h(1-n)$

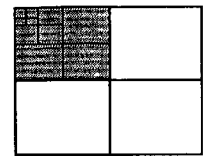
FIG. 10
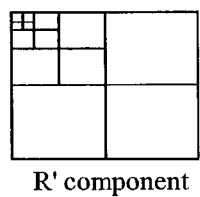   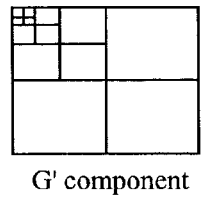   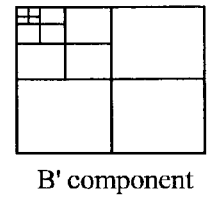
R' component          G' component          B' component
FIG. 11
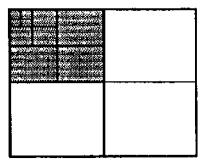
FIG. 12
FIG. 13

Original Frame
Reconstructed Frame (Case 1)
Reconstructed Frame (Case 3)
Reconstructed Frame (Case 4)
Frame (Case 2)
FIG. 15 Original Frame(#50) and Reconstructed Frames

PSNR values for "Bright" sequence

COLOR VIDEO CODING SCHEME

RELATED APPLICATIONS

This patent application is a U.S. Continuation-In-Part Patent Application of "Method and Apparatus for Three-Dimensional Wavelet Transform" by Acharya et al., filed on May 29, 2001, U.S. patent application Ser. No. 09/867,784, now U.S. Pat. No. 6,956,903; "Method and Apparatus for Coding of Wavelet Transformed Coefficients" by Acharya et al., filed on May 29, 2001, U.S. patent application Ser. No. 09/867,781, now U.S. Pat. No. 6,834,123; and "Method of Compressing a Color Image" by Acharya et al., filed on Oct. 1, 1999, U.S. patent application Ser. No. 09/411,697, now U.S. Pat. No. 6,798,901; all of the foregoing assigned to the assignee of the current invention and herein incorporated by reference.

BACKGROUND

This disclosure is related to color video and/or image coding.

Color images and/or videos are usually visually appealing and have been found at times to convey more information than gray scale images or video. Therefore, efficient color image and/or video compression schemes are desirable. One issue in coding video, for example, including color video, is motion estimation. Motion estimation is typically computationally intensive and may also affect the amount of compression achieved.

BRIEF DESCRIPTION OF THE DRAWINGS

The subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

FIGs. 7–13 are schematic diagrams illustrating color components of a transformed color image and associated computations to code the transformed image for one particular embodiment;

FIG. 15 is a sequence of images illustrating a frame that has been coded and reconstructed in accordance with various potential color coding embodiments;

DETAILED DESCRIPTION

Figure 1:
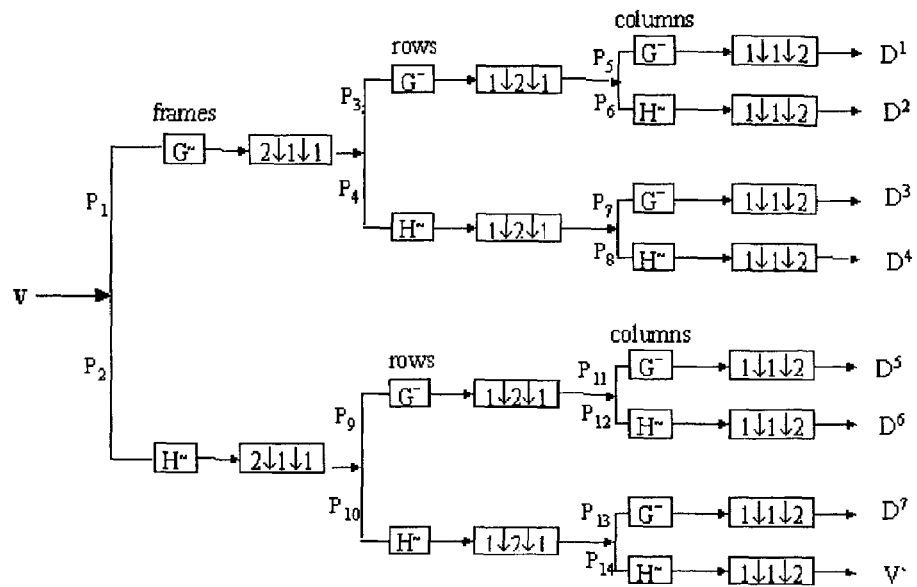
FIG. 1 is a schematic diagram illustrating an embodiment of a 3-D wavelet transform.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

In one embodiment, an efficient color coding scheme for color video using three dimensional (3-D) discrete wavelet transforms (DWT) employing correlation among different color components is described. Of course, the claimed subject matter is not limited in scope to employing a DWT. Other wavelet transforms may be employed within the scope of the claimed subject matter. However, experimental results for such an embodiment are also provided. Furthermore, to produce experimental results, several aspects of the coding were specified; however, this is merely an example embodiment and the claimed subject matter is not limited in scope to these specified coding aspects or to this particular embodiment.

One aspect of the following embodiment is the notion that a sequence of still images or video may be treated as 3-D data or as a 3-D image. One advantage for this particular embodiment is that motion estimation is not employed to perform coding. It shall be noted that for this embodiment this produced levels of compression that typically are not available with conventional approaches. Furthermore, this embodiment is typically less computationally intensive than such conventional approaches.

Since color models (RGB, YUV, YCbCr, etc.) are usually inter-convertible and are frequently provided in red-green-blue (RGB) format, this embodiment employs RGB format. However, the claimed subject matter is not limited in scope to this particular format. Likewise, here, the green component may be taken as a reference component for the red and blue components. This may be at least in part because the human eye is more sensitive to luminance and much of the luminance information may be contained in the green component. However, again, this is merely an example embodiment.

One embodiment of a method of color coding a sequence of frames may include the following. A three-dimensional wavelet transform may be applied to the color components of the sequence of frames or color video. At least one of the color components may be coded. Additionally, an adjustment to at least some remaining color components may be coded relative to the at least one coded color component. Likewise, an embodiment of a method of decoding and reconstructing a sequence of coded color frames includes the following. At least a color component that has been coded is decoded. Adjustments to the at least one decoded color component are decoded to produce remaining color components. An inverse 3-D wavelet transform is applied to the decoded color components to reconstruct the sequence of color frames.

Although the claimed subject matter is not limited in scope in this respect, one approach to applying a DWT in three dimensions is described in aforementioned "Method and Apparatus for Three-Dimensional Wavelet Transform," U.S. patent application Ser. No. 09/867,784.

This particular embodiment, here applied to color video, includes the following.

1. R, G, and B components of a color video sequence are independently 3-D wavelet transformed to give 3-D Wavelet coefficients of individual color components, such as R, G, B.
2. G color plane coefficients, in this embodiment, are coded using 3-D wavelet coding.
3. R and B color plane coefficients, in this embodiment, are coded with respect to G plane coefficients.

These tasks are discussed in detail below.

In this particular embodiment, a multi-resolution wavelet representation, such as for a DWT, may be employed to provide a simple hierarchical framework for interpreting an image. At different resolutions, the details of an image generally characterize different physical structures of a scene. A coarse to fine approach may be employed to assist in the coding of the transformed image, as well as to result in effective compression. When the approach is applied to a video sequence, it may be modified from a 2-D to a 3-D transform.

The procedure followed to perform the 3-D wavelet transform may be explained using the diagram shown in FIG. 1. For this embodiment, at each level of decomposition, a 3-D DWT will decompose the sequence of video frames into 8 subbands—one low frequency 3-D subband (denoted as LLL subband in FIG. 2) and seven high frequency 3-D subbands or detailed sub-blocks.

The input video sequence, here designated V, may be treated as a 3-D block with the different frames arranged substantially according to time position. This sequence, in this particular embodiment may be fed to two paths, designated $P_1$ and $P_2$. Along one path, here $P_1$, filtering along the time axis may be applied, in this embodiment with filter function g(n). The filtered data, again, in this particular embodiment may be sub-sampled, here by 2. Thus, in this embodiment, alternative frames of the block may be retained. The frames from this reduced block may be again fed into two paths, here $P_3$ and $P_4$, as illustrated in FIG. 1.

Along one of the paths or sub-paths, such as here $P_3$, filtering may be applied along the rows, again with filter function g(n). The filtered data, again, in this particular embodiment may be sub-sampled, here by 2. Here, alternative columns of the matrix or frame may be retained. This reduced matrix may be fed into two paths, $P_5$ and $P_6$ as illustrated in FIG. 1.

Along direction $P_5$, here, filtering may be applied along the columns with filter function g(n). The filtered data may be sub-sampled by 2. Alternative rows of the matrix may be retained. This may produce a detail signal, $D^1$.

Along the other direction, here $P_6$, filtering may be applied along the columns with filter function h(n), in this particular embodiment. The filtered data may be sub-sampled by 2, again, for this particular embodiment. Alternative rows of the matrix may be retained. This may produce a detail signal, $D^2$.

In the other sub-path, here $P_4$, filtering may be applied along the rows with filter function h(n). The filtered data may be sub-sampled by 2. Alternative columns of the matrix may be retained. This reduced matrix may again split into two paths, $P_7$ and $P_8$ in FIG. 1.

In one direction $P_7$, filtering may be applied along the columns, here with filter function g(n). The filtered data may be sub-sampled by 2. Here, alternative rows of the matrix may be retained. This may produce a detail signal, $D^3$.

In the other direction $P_8$, filtering may be applied along the columns, here with filter function h(n). The filtered data may be sub-sampled by 2. Alternative rows of the matrix may be retained. This may produce a detail signal, $D^4$.

In the other path, here $P_2$, filtering may be applied along the time axis, here with filter function h(n) in this embodiment. The filtered data may be sub-sampled by 2, in this embodiment. Alternative frames of the block may be retained. The frames from this reduced block may be again fed into two paths, $P_9$ and $P_{10}$ in FIG. 1.

In one sub-path $P_9$, filtering may be applied along the rows, with filter function g(n) in this embodiment. The filtered data may be sub-sampled by 2. Thus, alternative columns of the matrix or frame may be retained. This reduced matrix may be again fed into two paths, $P_{11}$ and $P_{12}$ in FIG. 1.

In one direction, here $P_{11}$, filtering may be applied along the columns, here with filter function g(n). The filtered data may be sub-sampled by 2. Thus, alternative rows of the matrix may be retained. This may produce a detail signal, $D^5$.

In the other direction, here $P_{12}$, filtering may be applied along the columns, here with filter function h(n). The filtered data may be sub-sampled by 2. Thus, alternative rows of the matrix may be retained. This may produce a detail signal, $D^6$.

In the other sub-path $P_{10}$, filtering may be applied along the rows, here using h(n). The filtered data may be sub-sampled by 2. Alternative columns of the matrix may be retained. This reduced matrix may again be split into two paths, $P_{13}$ and $P_{14}$ in this embodiment.

In one direction, here $P_{13}$, filtering may be applied along the columns with filter function g(n). The filtered data may be sub-sampled, here by 2. Alternative rows may be retained. This may produce a detail signal, $D^7$.

In the other direction $P_{14}$, filtering may be applied along the columns with filter function h(n) in this embodiment. The filtered data may be sub-sampled by 2. Therefore, alternative rows of the matrix may be retained. This may produce a detail signal, V'.

Thus, seven detail subblocks may be extracted that provide the variations of the edge information, eg, horizontal, vertical and diagonal, with time. The other, or eighth, subblock or component, in this embodiment, may be the applied video sequence at a lower resolution, due to low pass filtering, such as by h(n) in this embodiment. Applying compression to produce these blocks, such as described in more detail hereinafter, for example, therefore, may produce 3-D coding.

Figure 3:
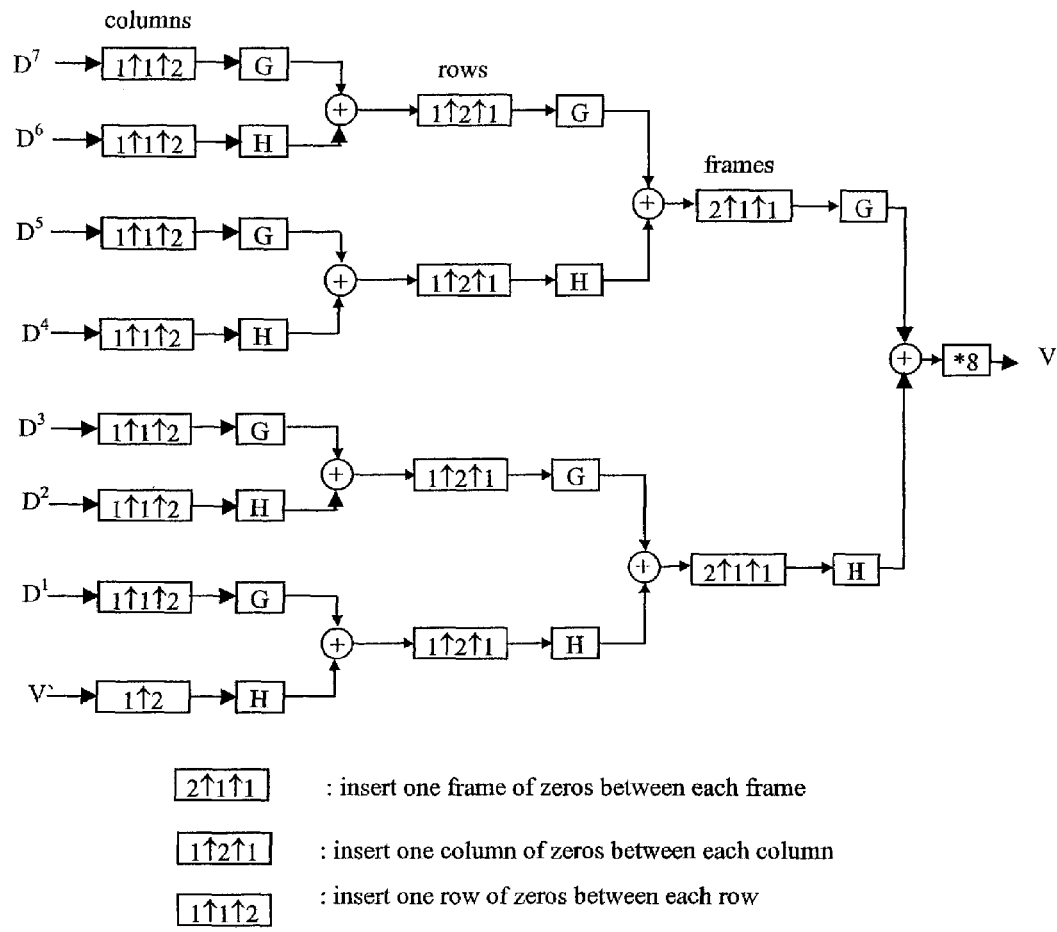
FIG. 3 is a schematic diagram illustrating an embodiment of 3-D wavelet reconstruction for the embodiment of FIG. 1.

Similarly, an inverse 3D discrete wavelet transform or reconstruction approach may be explained using a diagram, such as shown in FIG. 3. Such a decoding scheme is explained in more detail in the aforementioned U.S. patent application Ser. No. 09/876,781, although, again, the claimed subject matter is not limited in scope to this approach. In general, however, some amount of correspondence or association between the approach employed to encode and the approach employed to decode the sequence may typically take place. For one particular embodiment, a method of applying an inverse three-dimensional discrete wavelet transformation (3D IDWT) to a plurality of transformed video image sub-blocks, the sub-blocks comprising transformed frames, and the frames comprising rows and columns, may include the following. The transformed video image sub-blocks may be inverse transformed by: up-sampling the respective sub-blocks by row, column and frame; filtering and combining one or more respective pairs of up-sampled sub-blocks to produce an up-sampled sub-block corresponding to each respective pair; reapplying the previous to any produced up-sampled sub-block pairs until one up-sampled sub-block remains; multiplying the one remaining up-sampled sub-block by eight to produce a block at the next higher resolution.

This approach is described and illustrated with reference to FIG. 3 as follows, although, the claimed subject matter is not limited in scope to this particular approach. Detail signal $D^1$ may be up-sampled. For example, a row of zeros may be inserted between adjacent rows. This sub-block may then be filtered along the columns with the filter function g(n). Detail signal $D^2$ may be up-sampled. For example, a row of zeros may be inserted between adjacent rows. This sub-block may then be filtered along the columns with the filter function h(n). The resulting output signals from applying the foregoing processes to $D_1$ and $D_2$ are added, as illustrated in FIG. 3. The resultant sub-block may be up-sampled. For example, a column of zeros may be inserted between adjacent columns. This matrix may then be filtered along the rows with the filter function g(n) to produce interim signals $I_1$.

Detail signal $D^3$ may be up-sampled. For example, a row of zeros may be inserted between rows. This sub-block may then be filtered along the columns with the filter function g(n). Detail signal $D^4$ may be up-sampled. For example, a row of zeros may be inserted between rows. This sub-block may then be filtered along the columns with the filter function h(n). The resultant output signals from applying the foregoing processes to $D_3$ and $D_4$ may be added. The resultant sub-block may be up-sampled. For example, a column of zeros may be inserted between columns. This matrix may then then filtered along the rows with the filter function h(n). The resultant output signals here may be added with interim signals $I_1$. The resultant sub-block may be up-sampled. For example, a frame of zeros may be inserted between frames. This matrix may be then filtered along the frames with the filter function g(n) to produce interim signals $I_2$.

Detail signal $D^5$ may be up-sampled. For example, a row of zeros may be inserted between adjacent rows. This sub-block may then be filtered along the columns with the filter function g(n). Detail signal $D^6$ may be up-sampled. For example, a row of zeros may be inserted between adjacent rows. This sub-block may then be filtered along the columns with the filter function h(n). The resulting output signals from applying the foregoing processes to $D_5$ and $D_6$ may be added, as illustrated in FIG. 3. The resultant sub-block may be up-sampled. For example, a column of zeros may be inserted between adjacent columns. This matrix may then be filtered along the rows with the filter function g(n) to produce interim signals $I_3$.

Detail signal $D^7$ may be up-sampled. For example, a row of zeros may be inserted between rows. This sub-block may then be filtered along the columns with the filter function g(n). Detail signal V' may be up-sampled. For example, a row of zeros may be inserted between rows. This sub-block may then be filtered along the columns with the filter function h(n). The resultant output signals may be added. The resultant sub-block may be up-sampled. For example, a column of zeros may be inserted between columns. This matrix may then be filtered along the rows with the filter function h(n). The resultant output signals may be added with interim signals $I_3$. The resultant sub-block may be up-sampled. For example, a frame of zeros may be inserted between frames. This matrix may then be filtered along the frames with the filter function h(n). The resultant output signals may be added with interim signals $I_2$. The resultant sub-block may be multiplied by 8 to get the sub-matrix to the next level of resolution. diagram as shown in FIG. 3.

Figure 2:
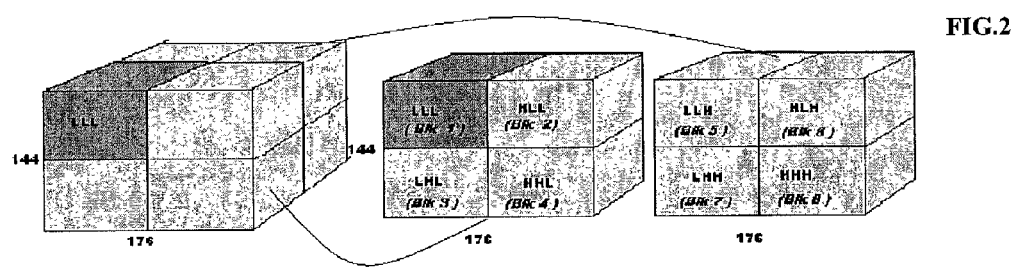
FIG. 2 is a schematic diagram illustrating the sub-blocks that may be employed in the embodiment of FIG. 1.

Quantization factors that may be applied to different blocks at the highest level of 3-D wavelet coefficients are given in table 1 (refer to FIG. 2 for block numbers). Quantization factors for other blocks may be derived from the quantization factor applied to the block at the next higher level (but at the same orientation) by multiplying with 2. These quantization parameters have been generated by evaluation on a number of color video clips. Of course, the claimed subject matter is not limited in scope to these parameters or to employing quantization. However, in this particular embodiment, the wavelet coefficients for the associated sub-blocks are divided by these factors prior to coding.

TABLE 1

Different Uniform Scalar Quantization parameters imposed on different subband decomposed 3-D blocks as shown in FIG. 2.

| | Blk 2 | Blk 3 | Blk 4 | Blk 5 | Blk 6 | Blk 7 | Blk 8 |
|---|---|---|---|---|---|---|---|
| Quantization values | 1.15 | 1.15 | 1.4 | 1.2 | 1.25 | 1.54 | 1.7 |

A DWT transformed G color plane in a 3D sequence may be encoded as described, for example, in "*Method and Apparatus for Coding of Wavelet Transformed Coefficients*" U.S. patent application Ser. No. 09/867,781. One particular video embodiment is provided below, although the claimed subject matter is not limited in scope to this particular embodiment.

Figure 4:
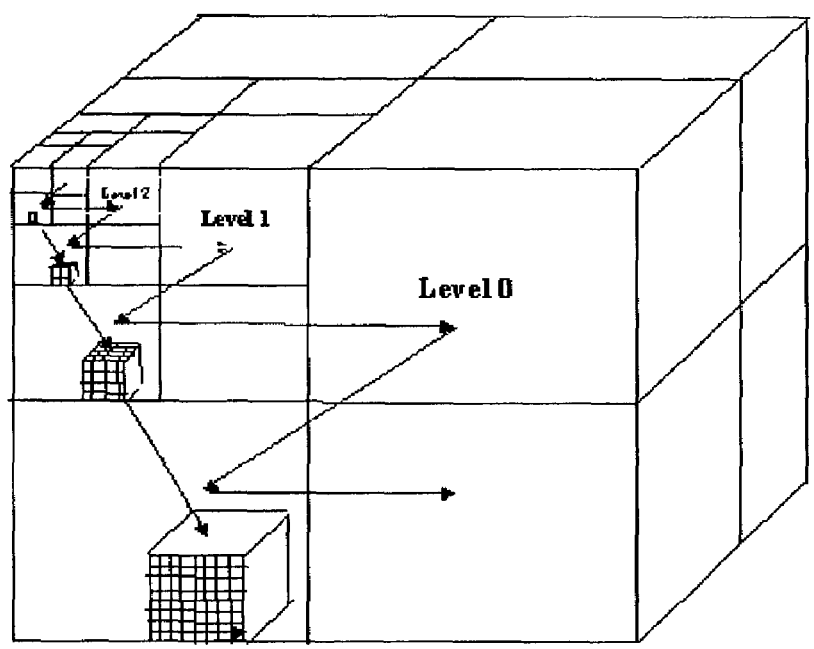
FIG. 4 is a schematic diagram illustrating a parent-child relationship for an embodiment of a 3-D wavelet transform coding scheme.
Figure 5:
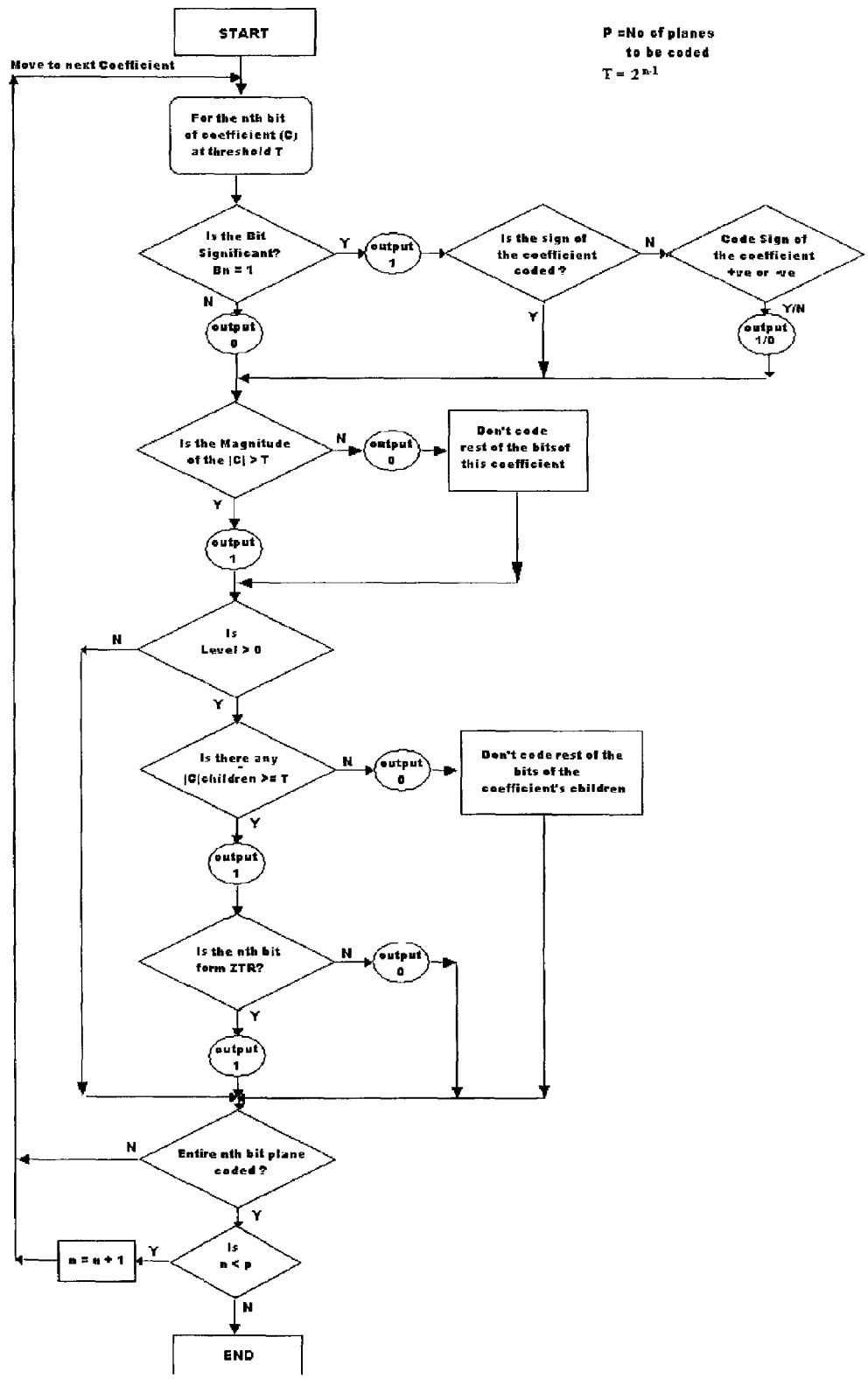
FIG. 5 is a flowchart illustrating an embodiment of a coding scheme that may be employed for 3-D wavelet coefficients.
Figure 6:
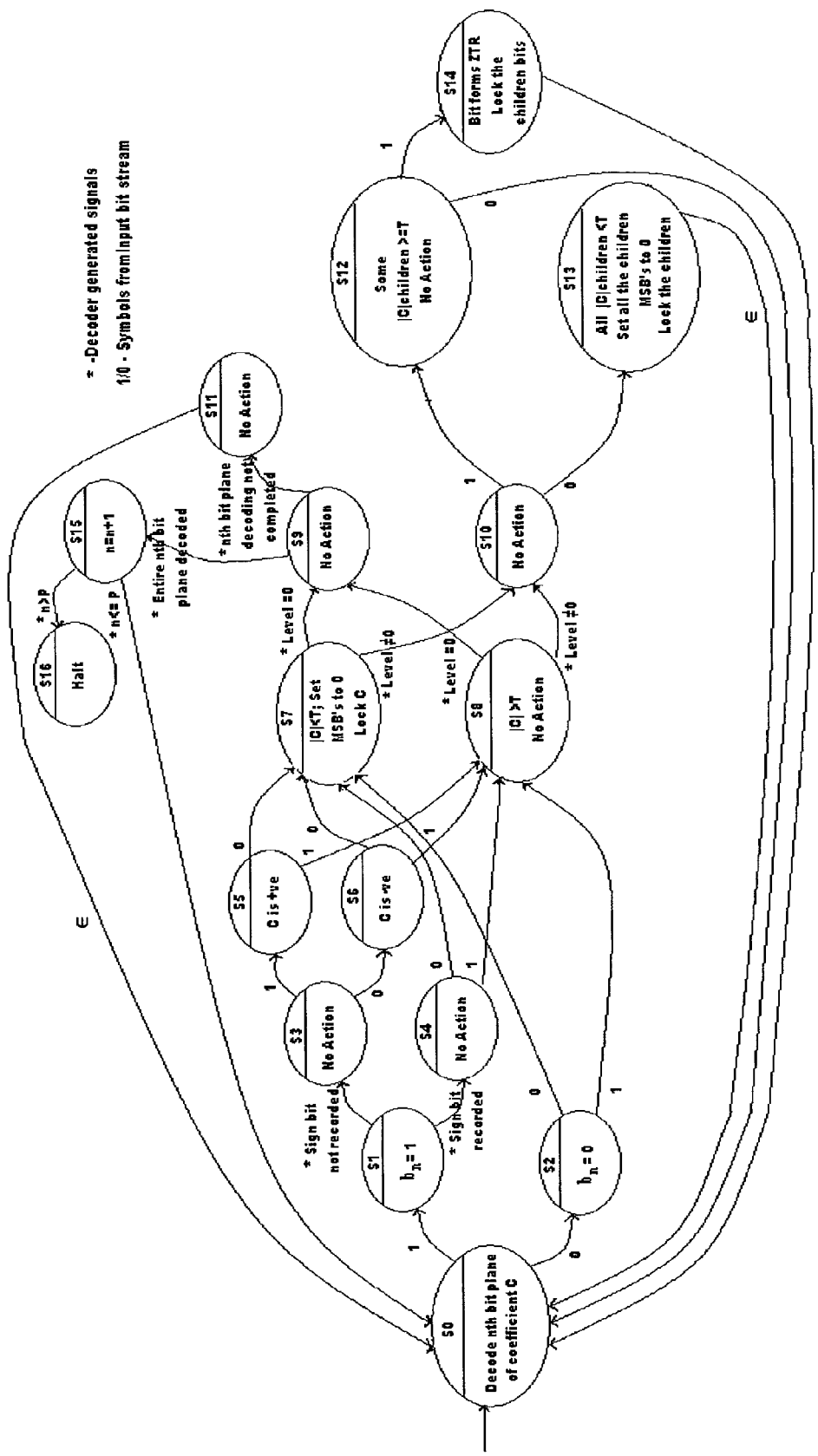
FIG. 6 is a state diagram of an embodiment of a decoding scheme that may correspond to the embodiment of FIG. 5.

A 3D wavelet transform decomposes an image into seven subbands, one low frequency subband (e.g., LLL) and seven high frequency subbands (e.g., LLH, LHL, LHH, HLL, HLH, HHL, HHH). The LLL subband has the characteristics of the original image and may be decomposed in multiple levels. In an example application, the decomposition may be applied up to 4 levels and, in this example, levels of the transform are numbered as in FIG. 4. Of course, the claimed subject matter is not limited in scope to this example or to this number of levels. The coefficients may be scanned in a particular pattern. The coefficients may be scanned in such a way so that no finer level coefficients are scanned before the coarser ones (indicated in diagonal and horizontal lines in FIG. 4). The parent-child relationship for a zero tree search (ZTR) is also illustrated in FIG. 4. The LLL band does not take part in the coding sequence in this particular embodiment. Here, it may be transmitted without changes. For example, any lossless coding method may be applied for this transmission. The starting threshold for the coding may be taken as 1 in this particular embodiment. In successive passes, the threshold may bedoubled. The total number of such passes may be $\lfloor \log_2(\max) \rfloor + 1$, where "max" in this embodiment denotes the maximum value among the magnitudes of all the coefficients to be encoded. A bit-based conditional coding scheme may also be applied in this particular embodiment, e.g., for a symbol, such as P, N, R, IZ , either bit 1 or 0 is coded, depending on the condition whether it is true or false. A flowchart is shown in FIG. 5 depicting the coding embodiment, whereas the corresponding decoding scheme is shown in FIG. 6 in the form of a state diagram. Again, this coding scheme applied to a 2-D example is explained in more detail in the aforementioned U.S. patent application Ser. No. 09/867,781.

Figure 7:
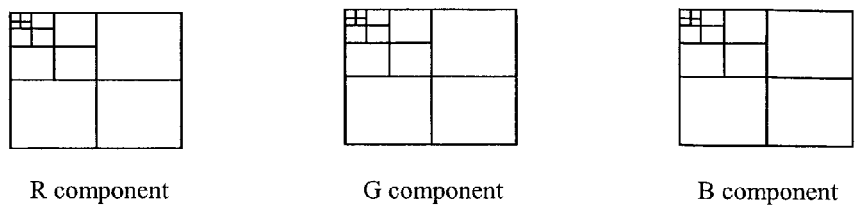
Figure 8:
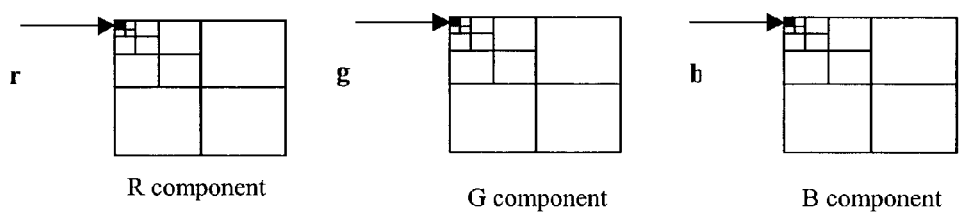

Coefficients of R and B planes may be coded using a technique described in "Method of Compressing a Color Image" U.S. patent application Ser. No. 09/411,697; although, of course, the claimed subject matter is not limited in scope in this respect. Applying this coding scheme to video, 3-D wavelet transformed coefficient planes for different color planes are shown in FIG. 7. In this particular embodiment, two coefficients, coeff_r and coeff_b, for the different subbands may be calculated and transmitted. Again, for this embodiment, the calculation may be performed as shown:

$$\text{coeff\_r} = r/g \ \& \ \text{coeff\_b} = b/g$$

where r, g, b are calculated on the coefficient values of the shaded regions shown in FIG. 8. They are the mean of the absolute values of the coefficients of the respective regions, in this embodiment. These two coefficients for the other subbands may be calculated in a similar manner taking the corresponding areas into account.

For the R component, the following may be performed. From the R coefficient values, a value based at least in part on the corresponding G values, in this particular embodiment, may be subtracted for the coefficients in the shaded region in FIG. 9. Of course, the value of coeff_r depends on the subband on which the calculations are being made. Mathematically, $$R\_\text{error}(i,j) = R(i,j) - \text{coeff\_r} * G(i,j)$$

Figure 9:
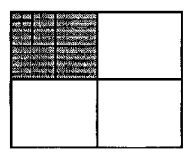

The values of the error in the shaded region as shown in FIG. 9 may, in this embodiment, be entropy coded and transmitted, e.g., a partial error frame may be coded and transmitted in this particular embodiment.

For the B component a similar approach may be applied in this embodiment. From the B coefficient values, again, appropriate values, in this embodiment based at least in part on the corresponding G values, may be subtracted, for the coefficients in the shaded region of FIG. 10. To put it mathematically, $$B\_\text{error}(i,j) = B(i,j) - \text{coeff\_b} * G(i,j)$$

The values in the shaded region, again, may be entropy coded and transmitted.

For decoding, an inverse scheme may be applied in this embodiment. From the G coefficients and coeff_r, coeff_b of different subbands, estimated R', B' coefficient value matrices may be constructed as follows. For the R component, values G' coefficients *coeff_r may be stored in corresponding places of the R matrix.

$$R'(i,j) = G'(i,j) * \text{coeff\_r}*$$

*Values of coegg_r and coeff_b are different for different subbands.

For the B component, values G' coefficients *coeff_b may be stored in corresponding places of the B matrix. To put it mathematically, $$B'(i,j) = G'(i,j) * \text{coeff\_b}$$

For the R component, the partial error matrix may be entropy decoded and then corresponding values may be added to previously estimated R' coefficient values. Mathematically, $$\text{new } R(i,j) = R'(i,j) + R\_\text{error}(i,j)$$

for all i, j in the shaded region of FIG. 12, for example.

For the B component, again, the partial error matrix may be entropy decoded and then corresponding values may be added to the previously estimated B' coefficient values.

$$\text{new } B(i,j) = B'(i,j) + B\_\text{error}(i,j)$$

for all i, j in the shaded region of FIG. 13, for example.

Figure 14:
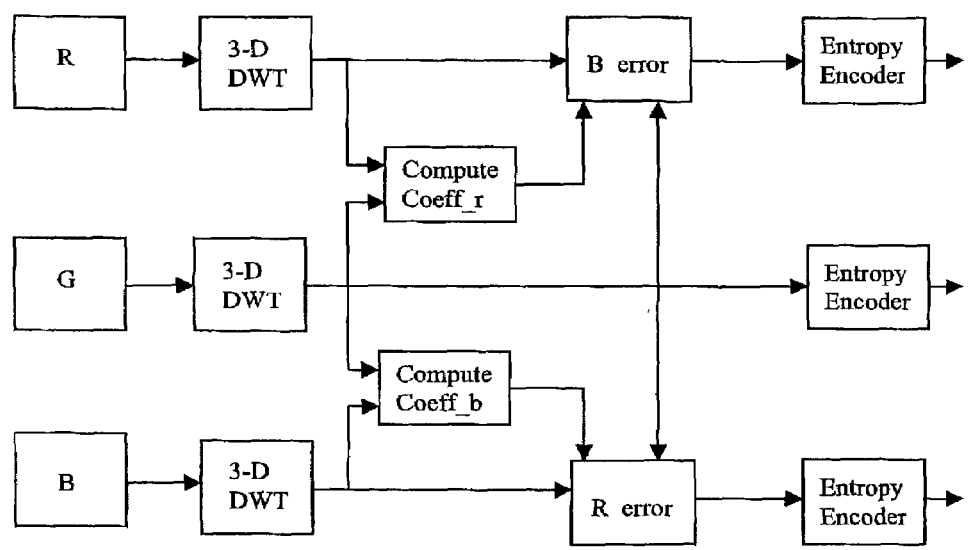
FIG. 14 is a schematic diagram illustrating the architecture for an embodiment of a color video coding scheme.

Once the R, G, B wavelet transformed matrices are thus calculated, an inverse 3-D wavelet transformation may be applied to get the reconstructed frames. A schematic diagram of this embodiment of a color video coding scheme is shown in FIG. 14. Decoding is obtained from reversing the process, as just described.

Here the results are presented on a RGB formatted 24 bits per pixel cif image (352*288) named "Bright" sequence. Four cases have been taken.

Case 1: R, G, B components were coded by the stated approach without quantization of the G component.

Case 2: In addition to the earlier case no outermost subbands of B and R components were transmitted.

Case 3: In addition to the earlier case the G component was quantized.

Case 4: In addition to the earlier case, quantization of B and R components was performed The results obtained were quite satisfactory, as shown in table 2.

TABLE 2

Compression ratios and PSNR values for different cases

| Case | B (PSNR) | G (PSNR) | R (PSNR) | Compression |
|------|----------|----------|----------|-------------|
| (1)  | 37.0     | 37.91    | 36.38    | 8.13        |
| (2)  | 36.51    | 37.91    | 35.91    | 9.03        |
| (3)  | 32.21    | 31.74    | 30.77    | 21.89       |
| (4)  | 31.32    | 31.74    | 30.19    | 74.25       |

Figure 16:
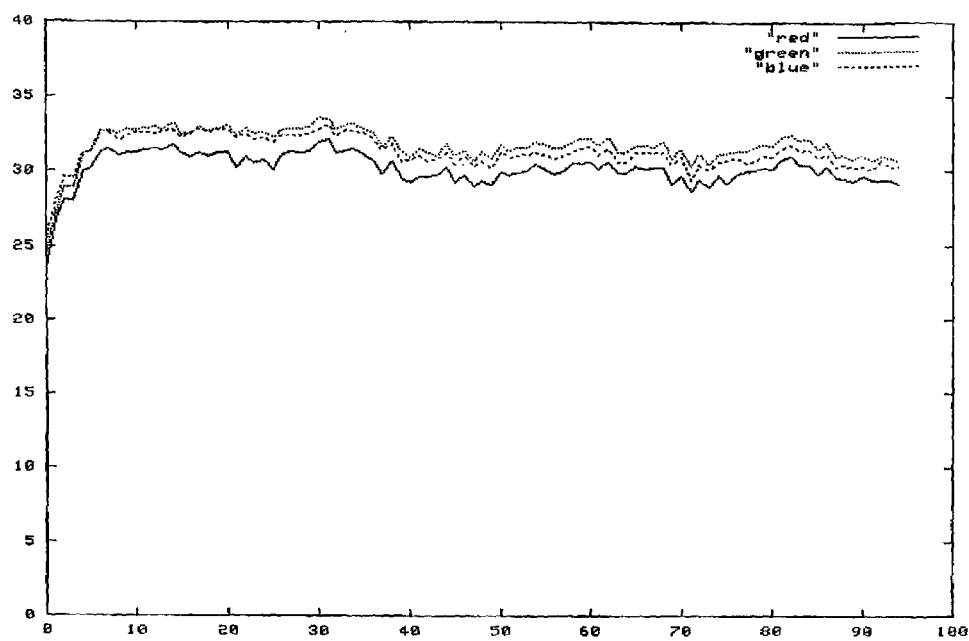
FIG. 16 is a plot illustrating PSNR performance for one of the potential coding embodiments of FIG. 15.

The PSNR values for R, G, B components for different frames is plotted for case (4) in FIG. 16. One of the reconstructed frames (Frame 50) for the different cases is shown in FIG. 15. Note that case 4 provides high compression with an acceptably small drop in PSNR.

Although the claimed subject matter is not limited in scope to the particular embodiments described and shown, nonetheless, these embodiments provide a number of potential advantages. An applied 3D wavelet transformation technique has been shown to reduce redundancies in the image sequence by taking advantage of spatial as well as temporal redundancies. No computationally complex motion estimation/compensation technique is employed in this particular embodiment. Likewise, since no motion estimation/compensation based DCT technique is applied, the reconstructed video generally has fewer visually annoying or blocking artifacts. For the most part, the previously described coding scheme is computationally faster and efficiently codes the 3D wavelet transformed coefficients by employing fewer bits. Hence, it improves compression performance. Furthermore, by applying bit-plane processings with minor modifications to the previously described technique, parallel execution may be employed. Likewise, a bit-plane coding and decoding approach makes such an embodiment of a video coder suitable for a progressive coding environment.

Figure 17:
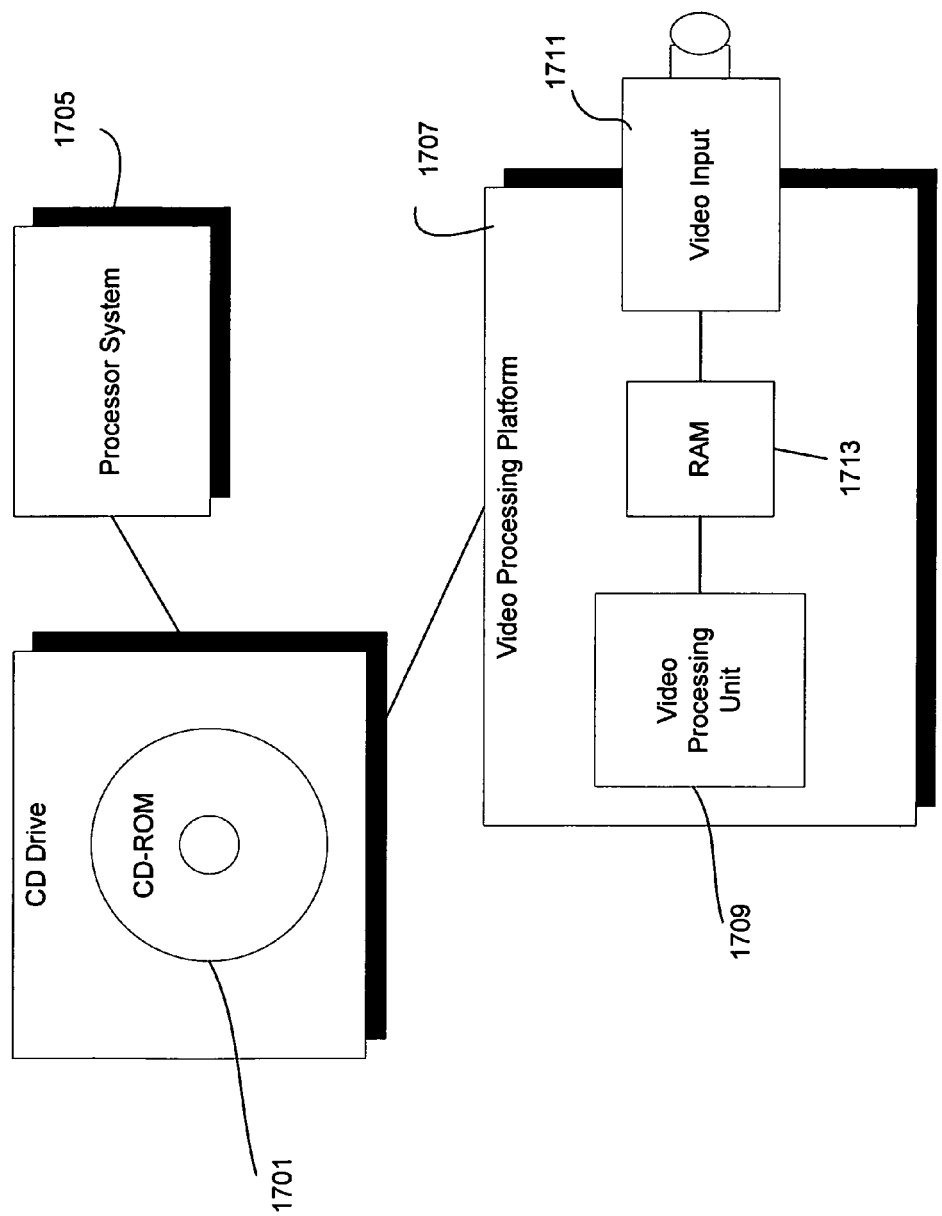
FIG. 17 is a block diagram illustrating a computer readable medium encoded according to an embodiment of the invention.

It will, of course, be understood that, although particular embodiments have just been described, the claimed subject matter is not limited in scope to a particular embodiment or implementation. For example, one embodiment may be in hardware, such as implemented to operate on an integrated circuit chip, for example, whereas another embodiment may be in software. Likewise, an embodiment may be in firmware, or any combination of hardware, software, or firmware, for example. Referring to FIG. 17, likewise, although the claimed subject matter is not limited in scope in this respect, one embodiment may comprise an article, such as a storage medium 1701. Such a storage medium, such as, for example, a CD-ROM 1701, or a disk, may have stored thereon instructions, which when executed by a system, such as a computer system or platform 1705. or an imaging or video system 1707, for example, may result in an embodiment of a method in accordance with the claimed subject matter being executed, such as an embodiment of a method of color video coding, for example, as previously described. For example, an image or video processing platform 1707 or another processing system may include a video or image processing unit 1709, a video or image input/output device 1711 and/or memory 1713.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. A method of color coding a sequence of color frames comprising:
applying a three-dimensional wavelet transform to color components of the sequence of color frames;
coding at least one of the color components; and
coding an adjustment to at least some remaining color components relative to the at least one color component, wherein the adjustment comprises a partial error adjustment based at least in part on a ratio of color components intensities.

2. The method of claim 1, wherein the color components comprise three color components.

3. The method of claim 2, wherein the three color components comprise R, G, and B.

4. The method of claim 3, wherein the at least one component comprises G.

5. The method of claim 1, wherein the three-dimensional transform comprises a three-dimensional discrete wavelet transform.

6. The method of claim 1, wherein coding of the at least one color component comprises a bit-based conditional coding scheme.

7. The method of claim 1, wherein the adjustment is entropy encoded.

8. A method of decoding and reconstructing a sequence of coded color frames comprising:
decoding at least a color component that has been coded;
decoding adjustments to the at least one decoded color component to produce remaining color components, wherein at least one of the adjustments comprises a partial error adjustment based at least in part on a ratio of color components intensities; and
applying an inverse 3-D wavelet transform to the decoded color components to reconstruct the sequence of color frames.

9. The method of claim 8, wherein the color components comprise three color components.

10. The method of claim 9, wherein the three color components comprise R, G, and B.

11. The method of claim 10, wherein the at least one component comprises G.

12. The method of claim 8, wherein the inverse three-dimensional transform comprises an inverse three-dimensional discrete wavelet transform.

13. The method of claim 8, wherein decoding of the at least one color component comprises decoding a bit-based conditional coding scheme.

14. The method of claim 8, wherein the adjustment is entropy decoded at least in part.

15. An article comprising: a computer readable storage medium having stored thereon instructions that, when executed, result in a method of color coding a sequence of color frame by:
applying a three-dimensional wavelet transform to color components of the sequence of color frames;
coding at least one of the color components; and
coding an adjustment to at least some remaining color components relative to the at least one color component, wherein the adjustment comprises a partial error adjustment based at least in Part on a ratio of color components intensities.

16. The article of claim 15, wherein the instructions, when executed, result in applying a three-dimensional wavelet transform to color components comprising applying a three-dimensional wavelet transform to three color components.

17. The article of claim 16, wherein the three color components comprise R, G, and B.

18. The article of claim 17, wherein the at least one component comprises G.

19. The article of claim 15, wherein the instructions, when executed, result in the three-dimensional transform comprising a three-dimensional discrete wavelet transform.

20. The article of claim 15, wherein the instructions, when executed, result in the coding of the at least one color component comprising a bit-based conditional coding scheme.

21. The article of claim 15, wherein the instructions, when executed, result in the coding of the adjustment comprising entropy encoded.

22. An article comprising: a computer readable storage medium having stored thereon instructions that, when executed, result in a method of decoding and reconstructing a sequence of coded color frames being performed by:
decoding at least a color component that has been coded;
decoding adjustments to the at least one decoded color component to produce remaining color components, wherein at least one of the adjustments comprises a partial error adjustment based at least in part on a ratio of color components intensities; and
applying an inverse 3-D wavelet transform to the decoded color components to reconstruct the sequence of color frames.

23. The article of claim 22, wherein the instructions, when executed, result in the color components comprising three color components.

24. The article of claim 23, wherein the instructions, when executed, result in the three color components comprising R, G, and B.

25. The article of claim 24, wherein the instructions, when executed, result in at least one component comprising G.

26. The article of claim 22, wherein the instructions, when executed, result in the inverse three-dimensional transform comprising an inverse three-dimensional discrete wavelet transform.

27. The article of claim 22, wherein the instructions, when executed, result in decoding of the at least one color component comprising decoding a bit-based conditional coding scheme.

28. The article of claim 22, wherein the instructions, when executed, result in the decoding applied to the adjustment coding comprising entropy decoded at least in part.

* * * * *

UNITED STATES PATENT AND TRADEMARK OFFICE
CERTIFICATE OF CORRECTION

PATENT NO. : 7,106,910 B2
APPLICATION NO. : 10/206908
DATED : September 12, 2006
INVENTOR(S) : Acharya et al.

It is certified that error appears in the above-identified patent and that said Letters Patent is hereby corrected as shown below:

In column 9, at line 8, delete "." and insert --,--.

In column 10, at line 16, delete "Part" and insert --part--.

Signed and Sealed this

Twenty-seventh Day of November, 2007

JON W. DUDAS
*Director of the United States Patent and Trademark Office*